(12) United States Patent
Strothmann

(10) Patent No.: US 9,236,761 B2
(45) Date of Patent: Jan. 12, 2016

(54) DEVICE FOR CONTACTLESS CURRENT GENERATION, IN PARTICULAR BICYCLE DYNAMO, VEHICLE LIGHTING SYSTEM AND BICYCLE

(76) Inventor: Dirk Strothmann, Borgholzhausen (DE)

( * ) Notice: Subject to any disclaimer, the term of this patent is extended or adjusted under 35 U.S.C. 154(b) by 246 days.

(21) Appl. No.: 14/130,519

(22) PCT Filed: Mar. 31, 2012

(86) PCT No.: PCT/EP2012/001431
§ 371 (c)(1),
(2), (4) Date: Jan. 2, 2014

(87) PCT Pub. No.: WO2013/004320
PCT Pub. Date: Jan. 10, 2013

(65) Prior Publication Data
US 2014/0132155 A1    May 15, 2014

(30) Foreign Application Priority Data

Jul. 1, 2011   (DE) .................... 20 2011 102 664 U
Oct. 20, 2011   (DE) .................... 20 2011 107 060 U

(51) Int. Cl.
*B60Q 1/14*   (2006.01)
*H02J 7/34*   (2006.01)
(Continued)

(52) U.S. Cl.
CPC . *H02J 7/345* (2013.01); *B60Q 1/00* (2013.01); *B62J 6/08* (2013.01); *H02K 7/11* (2013.01); *H02K 7/1846* (2013.01); *H02K 21/14* (2013.01); *H02K 49/04* (2013.01)

(58) Field of Classification Search
CPC .......... H02K 7/1846; H02J 7/345; B60Q 1/00
USPC .............. 315/77, 78, 80, 82; 310/75 C, 67 A; 290/50
See application file for complete search history.

(56) References Cited

U.S. PATENT DOCUMENTS

| | | | | |
|---|---|---|---|---|
| 4,104,560 A | * | 8/1978 | Kato | ........................ B62J 6/001 315/131 |
| 2010/0019676 A1 | * | 1/2010 | Yen | ............................ B62J 6/12 315/78 |

(Continued)

FOREIGN PATENT DOCUMENTS

| | | |
|---|---|---|
| DE | 29822343 U1 | 3/1999 |
| EP | 2323242 A1 | 5/2011 |
| WO | 2010145663 A1 | 12/2010 |

*Primary Examiner* — Lincoln Donovan
*Assistant Examiner* — Thomas Skibinski
(74) *Attorney, Agent, or Firm* — David A. Guerra

(57) ABSTRACT

A device for contactless current generation, in particular bicycle dynamo, on a rotatable counter element, in particular wheel rim, with at least one movably mounted rotor element (2) having at least one magnet (3), and at least one coil (7), in the at least one winding of which a current can be induced by the magnet (3), which moves together with the rotor element (2), said current being usable to operate a consumer, wherein the rotor element (2) is movable by magnetic interaction with the counter element (1), characterized in that the rotor element (2) and the counter element (1) have different axial profiles, and, in an operative position, the rotor element (2) is designed to generate at least one magnetic field (6a, 6b) on the basis of an eddy current in the conductive counter element (1), which forms an uninterrupted circular path, in such a manner that, by means of continuous relative movement between the counter element (2) and rotor element (1), eddy current fields which are continuously opposed to one another and have oppositely polled magnetic fields (6a, 6b) to one another are induced in the counter element and the rotor element (2) is thus moved together with the counter element (1) with an eddy current gearing being formed. Furthermore, the invention relates to a vehicle lighting system and to a bicycle, each with a corresponding device for current generation.

19 Claims, 10 Drawing Sheets

(51) Int. Cl.
*B62J 6/08* (2006.01)
*H02K 7/11* (2006.01)
*H02K 7/18* (2006.01)
*H02K 49/04* (2006.01)
*B60Q 1/00* (2006.01)
*H02K 21/14* (2006.01)

(56) References Cited

U.S. PATENT DOCUMENTS

2014/0184067 A1* 7/2014 Frankovich ............... B62J 6/00
315/77
2015/0062939 A1* 3/2015 Frieden .................... B62J 6/06
362/475

* cited by examiner

DEVICE FOR CONTACTLESS CURRENT GENERATION, IN PARTICULAR BICYCLE DYNAMO, VEHICLE LIGHTING SYSTEM AND BICYCLE

CROSS-REFERENCE TO RELATED APPLICATIONS

This application is an U.S. national phase application under 35 U.S.C. §371 based upon co-pending International Application No. PCT/EP2012/001431 filed on Mar. 31, 2012. Additionally, this U.S. national phase application claims the benefit of priority of co-pending International Application No. PCT/EP2012/001431 filed on Mar. 31, 2012, German Application No. 20 2011 102 664.0 filed on Jul. 1, 2011, and German Application No. 20 2011 107 060.7 filed on Oct. 20, 2011. The entire disclosures of the prior applications are incorporated herein by reference. The international application was published on Jan. 10, 2013 under Publication No. WO 2013/004320 A1.

BACKGROUND OF THE INVENTION

1. Field of the Invention
2. Description of the Prior Art

The present invention relates to a device for contactless current generation, in particular bicycle dynamo, on a rotatable counter element, in particular wheel rim, with at least one movably mounted rotor element having at least one magnet, and at least one coil, in the at least one winding of which a current can be induced by the magnet, which moves together with the rotor element, said current being usable to operate a consumer, wherein the rotor element is movable by magnetic interaction with the counter element, characterized in that the rotor element and the counter element have different axial lines, and, in an operative position, the rotor element is designed to generate at least one magnetic field on the basis of an eddy current in the conductive counter element, which forms an uninterrupted circular path, in such a manner that, by means of continuous relative movement between the counter element and rotor element, eddy current fields which are continuously opposed to one another and have oppositely polled magnetic fields to one another are induced in the counter element and the rotor element is thus moved together with the counter element with an eddy current gearing being formed. Furthermore, the invention relates to a vehicle lighting system and to a bicycle, each with a corresponding device for current generation.

There is a variety of different bicycle dynamo types for current generation for bicycle lamps. This may be for example, sidewall dynamos or roller dynamo, whose friction wheel runs along at the side panel and/or on the bearing surface of the tire.

The disadvantage of these dynamo types is in the bad efficiency and the significant braking effect caused by the necessary high contact pressure at the tire as well as in weather dependence during mud, wetness and snow, as well as in often disturbing noise.

Beyond that for example hub dynamos are well-known.

Hub dynamos are directly integrated into the wheel hub and usually have a gear. They are independent of the weather and provide enough electrical power, but have the disadvantage of higher weight, which is an exclusion criterion in particular in sports wheels, and they can be upgraded only at great expense by replacing the wheel hub.

Classical contactless dynamos require additional magnets or magnetic rings in the spokes, which induce a voltage in fixed-mounted coils.

They run without contact and therefore noiseless and only have little braking effect. In order to achieve adequate power many additional magnets must be anchored manually in the spokes, which again is an exclusion criterion for sports wheels.

In addition, generators have been developed, in which one or more magnets within a component attached to the frame or the wheel fork are set in motion, in that the magnets or metal pieces mounted on the (on the rim or spokes) produce a directed magnetic interaction when passing the component.

SUMMARY OF THE INVENTION

The magnets which are set in motion in the solid component induce a current in the adjacent coil. All of these devices have the disadvantage of an additional mounting of magnetic or metal components on the wheel (e.g. WO 2001/033 700 A1).

It is an object of the present invention to provide an apparatus for generating electricity in particular for bicycles which can be manufactured simply and inexpensively, and which does not require additional magnets or metallic elements fixed in or on the wheel.

The object is solved by a subject according to claim 1 and by the subjects of claims 12 and 17. Advantageous further developments are given in the dependent claims which refer back to these claims and in the following descriptions of figures.

The invention is characterized in that the rotor element and counter element have different axial lines, and, in an operative position, the rotor element is designed to generate at least one magnetic field based on an eddy current in the conductive counter element, which forms an uninterrupted circular path, in such a manner that, by means of continuous relative movement between the counter element and rotor element, eddy current fields which are continuously opposed to one another and have oppositely polled magnetic fields to one another are induced in the counter element and the rotor element is thus moved together with the counter element with an eddy current gearing being formed.

The invention therefore only comprises one conducting counter element, in particular a wheel rim as gear wheel, which is magnetized shortly and which is coupled magnetically with a rotor element that contains a permanent magnet or electromagnet.

Here, the operative position, which is the distance between rotor element and counter element, acting as gear wheels, has to be selected so small that the magnetic field of the magnet of the rotor element induces sufficiently large eddy currents in the counter element (e.g. formed as a metal wheel) under circular motion of the counter element.

If magnets, as described in the following are used, a distance of more than 4 mm from the counter element can be maintained readily.

The eddy currents which are induced in the particularly paramagnetically chosen counter element, create temporary magnetic fields that are required for magnetic gearing of the two elements, counter element and rotor element, as an eddy current gear.

At each time this only effects a selective heating by induced eddy currents in the counter element, leading to a negligible heating, because the counter element cools down when rotating.

The heat losses occurring due to eddy currents are taken into account, since the advantages of contactless power transmission with temporary magnetic gearing predominate (compared to elaborate magnetic retrofitting of other systems).

A device according to the invention operates without contact and is therefore quiet. The magnetic coupling does not have problems with snow, ice, dirt or rain because friction is not required.

Encapsulation of the rotor element in a housing is easily possible, so that current generation can be carried out completely independent of snow, mud or the like.

Preferably the rotor element has a plurality of magnets, and in particular at least six magnets.

The magnetic fields generated by a plurality of magnets of the rotor element, which gear to some extent with the eddy current based magnetic fields of the counter element, are preferably formed symmetrically around the rotor element considered in circumferential direction of the rotor element.

For example the rotor element can be mounted, pivoted and moveable against the force of an energy accumulator. In this connection a regular structure of the magnetic fields of the rotor element is useful for optimum current generation. Preferably the rotor member is rotatably mounted about an axis wherein the magnets are arranged radially to the axis of rotation with their north/south orientation.

In particular, the north-south orientation of magnets which are arranged perpendicularly to the axis of rotation should be identical.

This is particularly the case for special numbers of magnets, which are twice an odd number (6, 10, 14, . . . , 2+n*4, etc. magnets, with n=1,2,3, . . . ).

The magnetic field line of the magnet which is closest to the rim (in particular the rim of a bicycle wheel) penetrates the counter-element in an operative position, and induces eddy current fields in the rim.

This, in turn, generates magnetic fields. The magnetic field orientated in rotation direction of the wheel, magnetically attracts the magnet, thus a force in direction of movement of the rim is exerted on the magnet, resulting in a rotational movement of the magnet ring.

For the favourable case that adjacent magnets on the rotor element have opposite polarities, this effect is reinforced by the fact that the eddy current inducing magnetic fields are polarized differently.

This results in an additional rejection of the preceding magnetic field (with respect to the rotation direction of the rim) so that the wheel rim and the magnetic rotor element, are coupled well as gearwheels of an eddy current gear.

Here, at last one magnet and in particular, all of the magnets of the rotor element is/are formed in a way that a rim of a bicycle wheel can be used as counter element which consists at least essentially of aluminium, steel or a conductive plastic material. Such a wheel, which forms an uninterrupted circular path and which is constructed as one piece, is already present on a variety of bicycles so that an inventive device can readily be used as upgraded bicycle dynamo. Here, the device has appropriate contacts to the cables of the coil.

Preferably neodymium permanent magnets can be used with magnetic field strength in a range from 750 to 1100 kA/m, in particular in a range from 850 to 1000.

These are sufficiently strong at small dimensions. For example flat, rectangular cuboid magnets of small size with edge lengths smaller than 2 cm can be placed on a hexagonal metal carrier, so that the rotor element is equipped with six magnets. An advantageous neodymium magnet has edge lengths of 20×10×5 mm. In order to generate eddy-current-based magnetic fields and hence voltage resp. current in a closed circuit when moving an aluminium wheel, such a magnetic wheel of a rotor element can then be positioned close to the rim side (e.g., within a range of 4 mm up to e.g. 10 mm). The device of the invention has appropriate fasteners for this purpose.

According to the invention a continuous torque is exerted on the magnetic wheel respectively the rotor element when moving the wheel, in contrast to prior art generators, where interrupted torques based on magnetic attraction of non-continuous metal elements or magnets are mounted additionally on the wheel. In addition to the simpler structure significantly higher torques can be achieved with correspondingly larger current yield, by using the existing wheel rim as transmission component.

For example 3 W output power can be achieved in case of two permanent magnet rings attached on both sides of the rim consisting of neodymium permanent magnet rings of six prescribed magnets with maximum energy product of 306 kJ/m3, 5 mm thickness (with a size of 20×10×5 mm) from an aluminium wheel at 20 km/h speed. The rotational speed of the magnet ring is derived from the rotational speed of the wheel and the ratio of the rim circumference to the "virtual" rotor element perimeter which results from the distance of the axis of rotation to the rim. The rotational speed of the rotor element is optionally further reduced in response to a slippage that is dependent on magnetic field intensity, distance to the wheel and rotational speed of the wheel.

The formation of the eddy current fields is particularly enhanced when the magnets of the rotor element are, at least partially, and preferably arranged at the outer side of a carrier which is for example metallic and spaced apart and distributed uniformly along the circumference of the carrier.

In one embodiment of the invention, the device of the invention may be provided with a winding which is part of a generator driven by the rotor element. Hereby the rotor element drives a shaft with some of its magnets, said shaft in turn is fitted with a magnet to generate a current in a generator of a conventional type.

However, a particularly advantageous embodiment of the invention has a coil winding that fully passes around the rotor element, and in particular coil and rotor element are sealed together in one housing. Here, the device is kept simple, it is more compact and has higher efficiency than conventional dynamos due to lower losses in the bearings. In particular, the winding may be formed by a single conductor, although other winding shapes are conceivable. In particular parts of a conductor can be formed as mutually angled windings, both leading around the rotor element.

A simple and effective coil arrangement has 360 degree passing windings that form a plane which is substantially parallel to the axis of rotation. In this way, the inventive device is relatively small and can be arranged close to the counter element, where both, the rotational axis and the coil planes are approximately parallel to a plane formed by the counter element. In an embodiment the device of the invention may contain a conductive, circular and closed part of a wheel of another vehicle instead of a bicycle rim.

In a further embodiment of the invention, the device comprises an energy storage which may be in particular a capacitor or battery, wherein the device is adapted to store electrical energy during operation of the device and subsequent delivery.

The problem stated above is also solved by a vehicle lighting system, in particular a bicycle lighting system, which contains a device for current generation as described before and subsequently and a lighting means which is connected to the coil.

This vehicle lighting system has the advantages listed above or below.

The present apparatus is particularly compact and energy-efficient, when the (at least one) lighting means is arranged at a housing of the device that encloses the coil, wherein the power supply of the lighting means can be instantiated by short cables with correspondingly small losses.

The lighting means can be integrated directly into the housing or it can be connected to the device by carriers/mounting means in at least one or various positions.

In particular, the entire device consisting of a generator, power supply and light source can be encapsulated completely in a housing and are thus it can be designed extremely insensitive to external stresses.

Preferably, the device of the invention is provided with two lighting means, wherein the lighting means, in particular containing at least one diode, are placed in separate circuits with different diode transmission directions, such that the circuits are alternately supplied with AC-current, induced in the coil by the rotor element.

The alternating current which is induced by the rotating rotor element in the coil windings is used to provide two circuits which are separated with respect to the forward direction.

A particularly advantageous, simple and yet effective variant, has diodes with opposite forward directions as lighting means.

The frequency of the AC current is dependent on the rotational speed of the rotor element, said rotor element is in turn dependent on the ratio of the two parts of the magnetic gear which are in particular rotatable. An advantageous ratio of 1:40 for a wheel with about 2 m circumference and magnet ring of about 6 cm to 8 cm in circumference allows for AC frequencies significantly above the human-eye dissolvable frequency of 20 Hz.

In this case the effective radius of the rotor element is obtained from the radius of the outer circular path described by the rotating rotor element in addition to the distance/size of the air gap between rotor element and counter element. Advantageously, the frequencies are in a range of 50 Hz to 150 Hz. Thus sufficient AC voltage is supplied by the changing magnetic fields of the rotating magnet ring/rotor element to produce light. The additional frictional losses, incurred when using a downstream generator unit, are avoided.

In particular high efficiency is obtained, in case of an even-numbered array of magnets, in which the north-south directions resp. polarities of the magnets are lying on an axis which is arranged perpendicular to the rotation axis of the counter element.

Instead of utilizing the alternating current in two separated circuits this can of course also be used in a single circuit. In addition, a vehicle lighting system according to the invention or an inventive device can have a circuit with rectifier, said rectifier is in particular downstream to the coil and rectifies the current generated in the coil. Advantageously, the vehicle lighting system according to the invention is also provided with a carrier unit, by which the distance of the rotor element to the counter element can be varied. Such a variation can take place preferably by the displacement of the carrier of the rotor element within an outer shell of the vehicle lighting system. Light output can be regulated selectively by changing the distance between rotor element and rim due to the changes in induced voltage.

The object stated above is also solved by a bicycle which has a vehicle lighting system as described above or below and which has as a rim that can be used as counter element.

There are a plurality of possibilities to attach an inventive device to a bicycle.

Here, the device for current generation is particularly arranged at a fork and/or a brake of the bicycle, in particular in such a way that that the current induced in the coil is increased by the approximation of the rotor element to the rim when braking, accompanied with the amplification of the light output. By reducing the effective circumference of the rotor element due to its approximation to the rim, the rotation speed of the rotor element is increased according to the change in gear ratios, which additionally leads to a reduction in slippage between the two rotating elements, namely, the rim and the rotor element so as to achieve a higher total power and consequently lighting up of the light. The use of a red brake light as light source at the rear wheel of an inventive bicycle thus enables the lighting up of the brake light, when slowing down the bicycle.

For this purpose the device according to the invention may by attached additionally to the brake pad on the brake arm. Additionally or alternatively to the direct arrangement on the brake pad, the device for current generation can be placed at or within the brake shoe, and so its position remains unchanged even when the brake pad is exchanged.

Especially the arrangement on or (at least partially) within the brake shoe leads to the advantageous behaviour of the lighting system during a braking operation.

Accordingly, a bicycle lighting system can have a brake shoe, in which the essential parts for current generation of a device according to the invention are already integrated and which can replace the brake shoes of conventional brake systems.

It is also possible to attach the device for current generation on the brake base of a cantilever brake or V-brake.

In general the coupling of counter element and rotor element can be achieved by mounting corresponding rotor elements on both sides of the rim of an inventive bicycle, which in turn induce a current in the respective coils and which are disposed in a mutually reinforcing magnetically active position. Hereby, the eddy currents induced in the rim can be enhanced by using adequate magnets, which also leads to an improved coupling of the system.

In the inventive objects the induced eddy currents and resulting magnetic fields in the wheel/rim are amplified at high rotation numbers, so that for this reason the slippage decreases significantly at higher speed.

In particular it is very advantageous, to attach the device elements in form of a horseshoe on the brake mounts of conventional bicycle forks, so that two rotor elements with mutually enhanced effects are placed on opposite sides of the rim, as described above. The horseshoe formation allows for a shockproof attachment, where the bulbs can be placed firmly above the tire.

Generally, an inventive bicycle can be equipped with two corresponding lighting systems, where weaker magnets with weaker bulbs can be used for a rear light.

A lighting system according to the invention that lights up during braking operation, may also have devices for power generation at the front brake as well as the rear brake, which are electrically coupled. Once the current of a device increases abruptly, unlike a slow acceleration of the bike, by pressing the brake, the current is amplified and transmitted to the tail light circuit.

For this purpose, simple switching elements like comparators and transistors can be used.

The embodiments described above and below are an improvement over previously known devices such as bicycle dynamos, as they ensure a non-contact (hence silent), all-weather, low-friction (and thus energy-efficient) power supply where no additional components have to be attached in or on the wheel.

BRIEF DESCRIPTION OF THE DRAWINGS

The invention also includes retrofitting of an existing sidewall dynamo by arranging a suitable magnet ring with small rim distance rather than directly touching the rim.

Further advantages and details of the invention are apparent from the following description.

In the schematic figures of the drawings:

Figure 1:
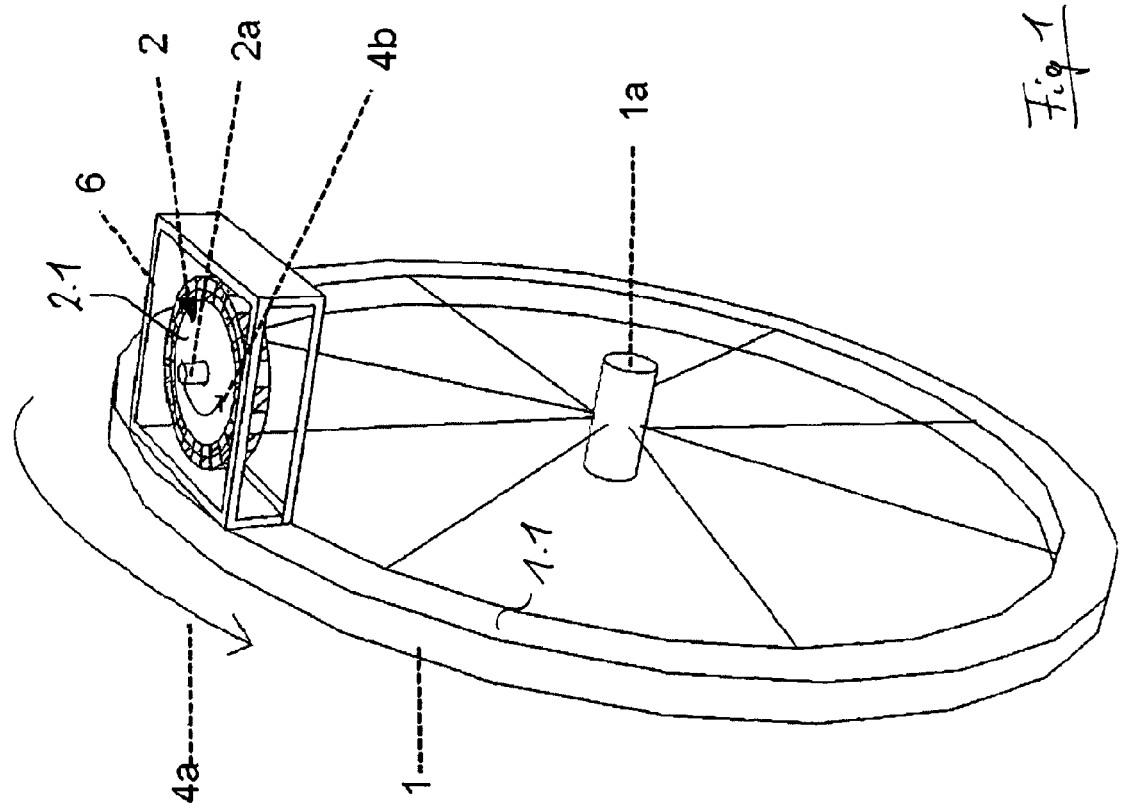
Figure 2:
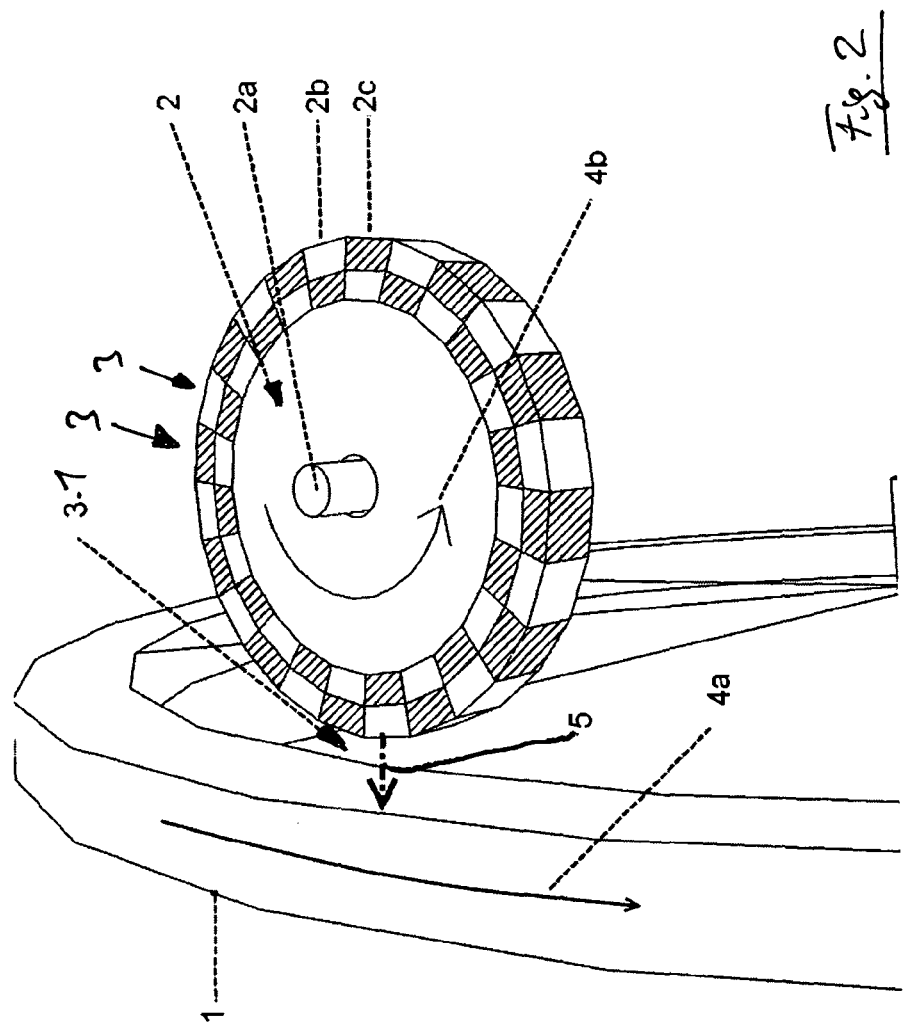
Figure 3:
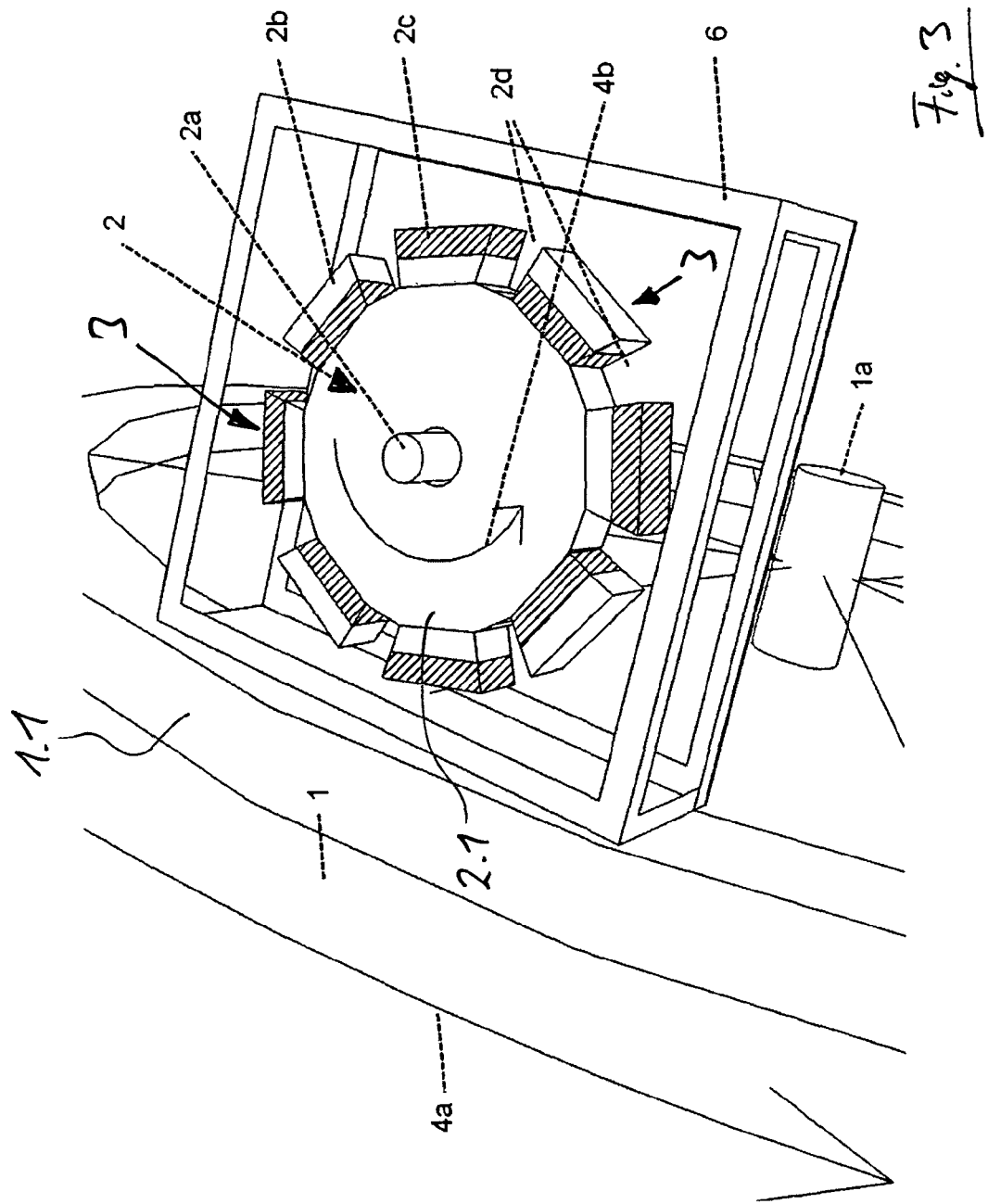
Figure 4:
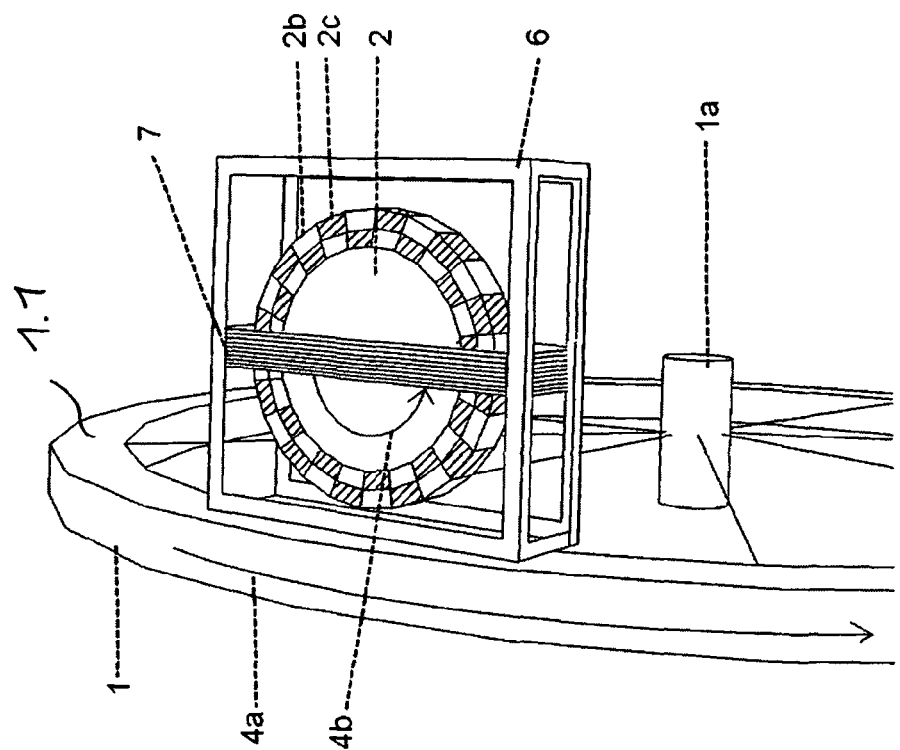
Figure 5:
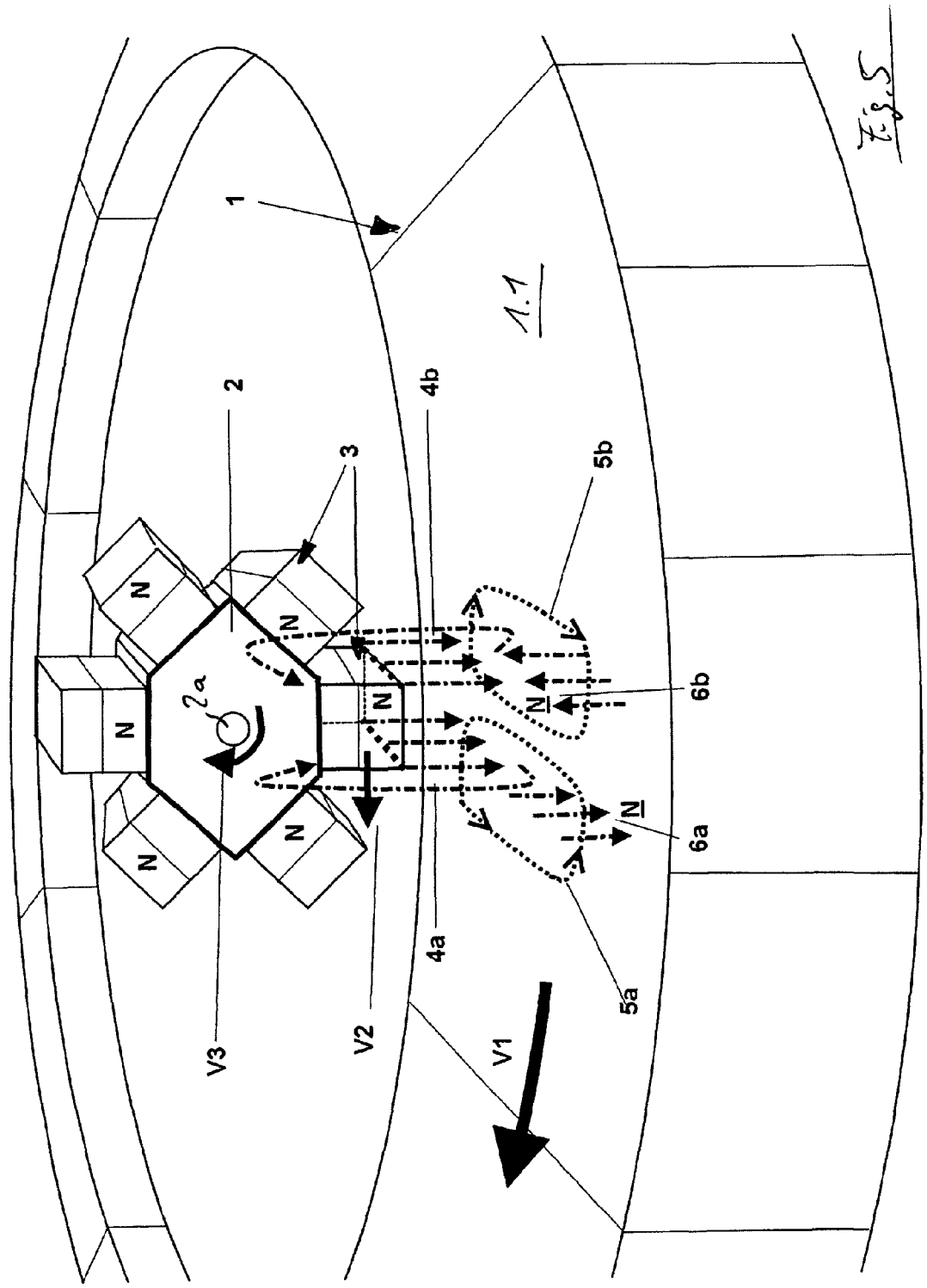
Figure 6:
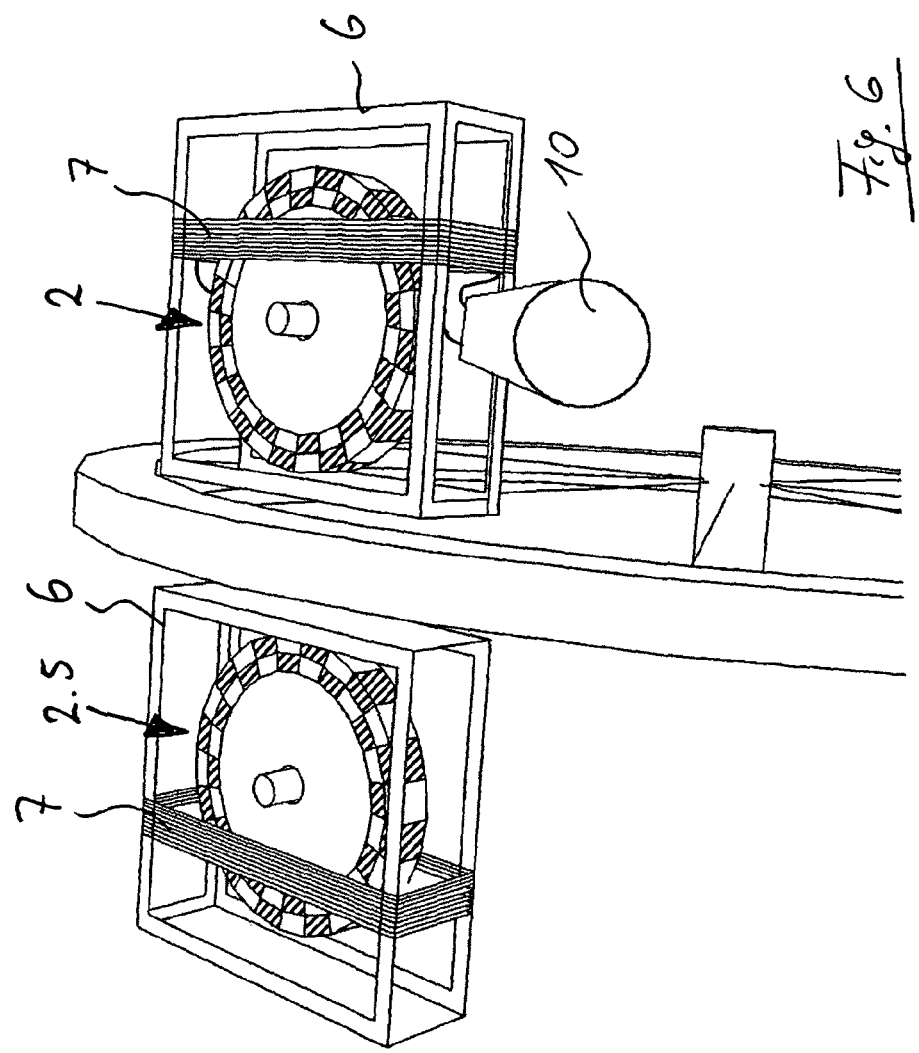
Figure 7:
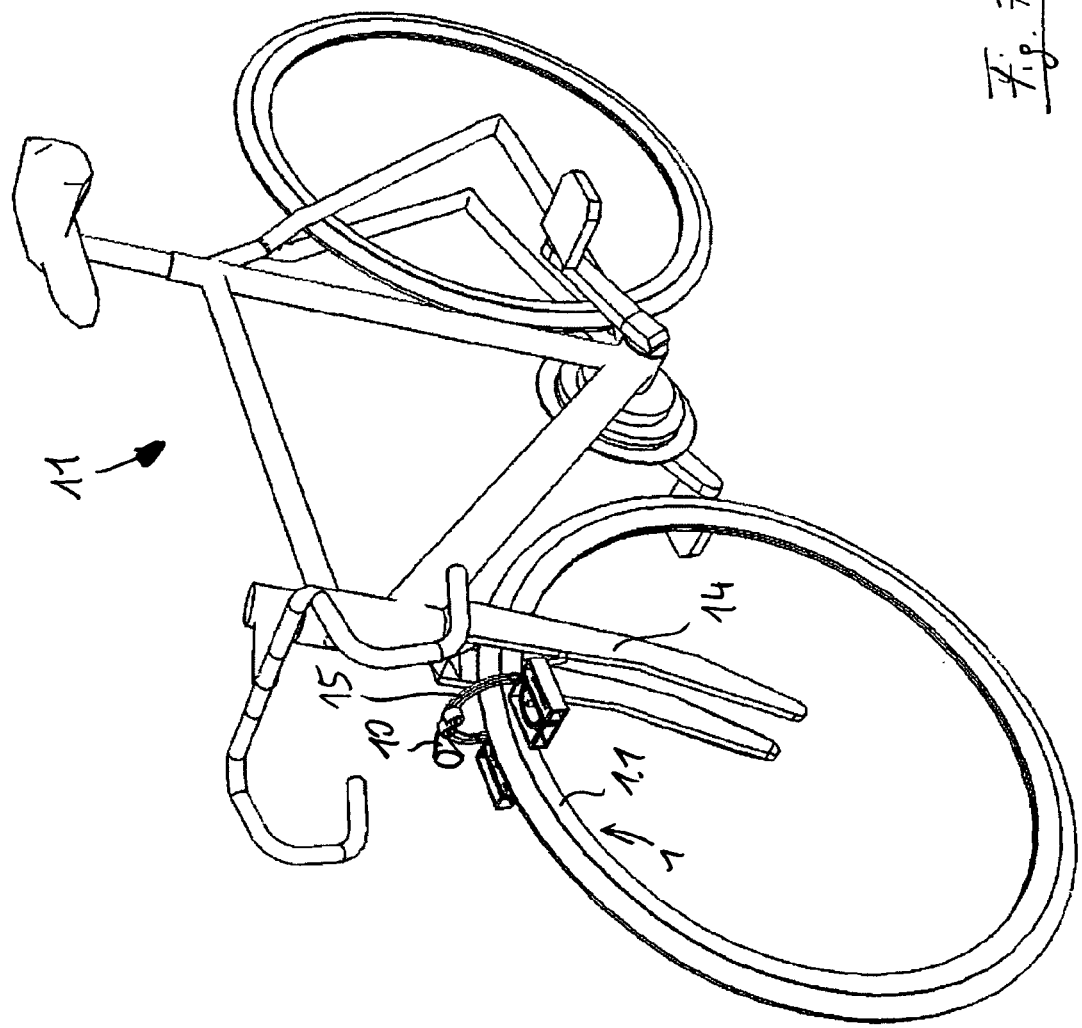
Figure 8:
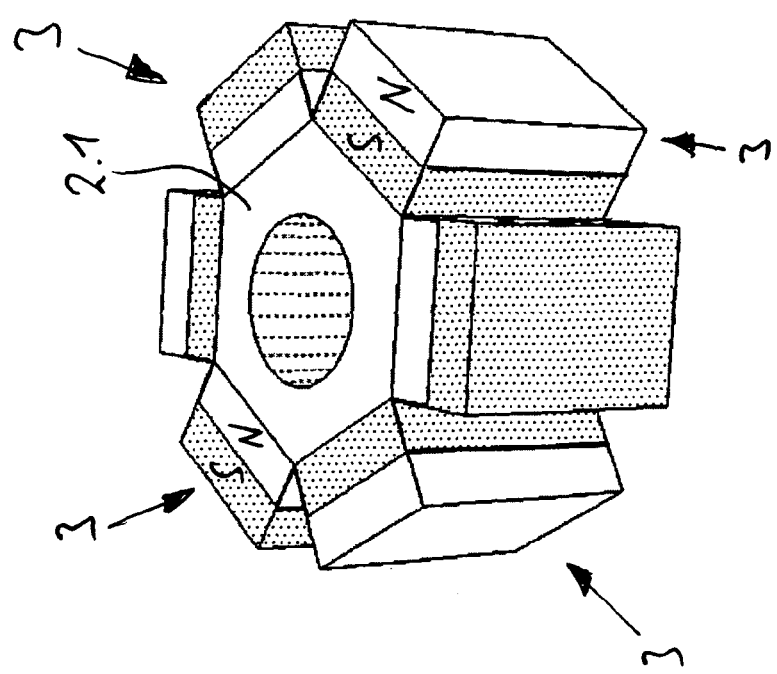
Figure 9:
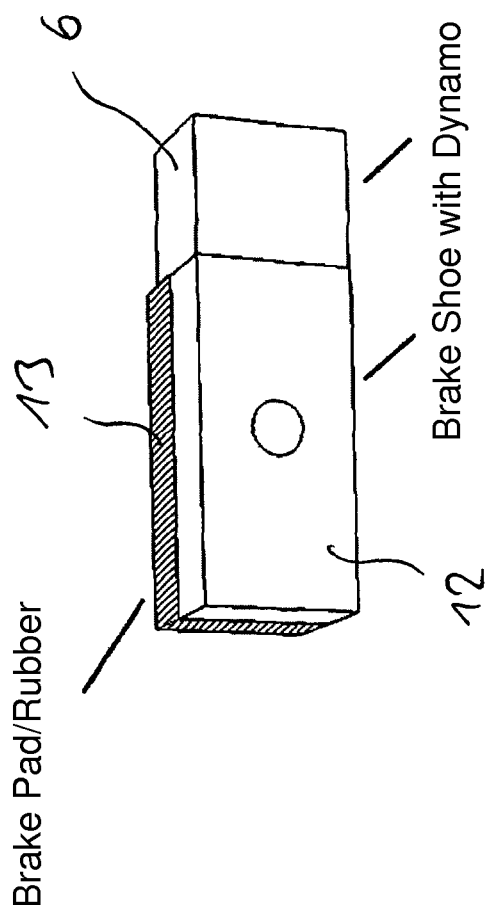
Figure 10:
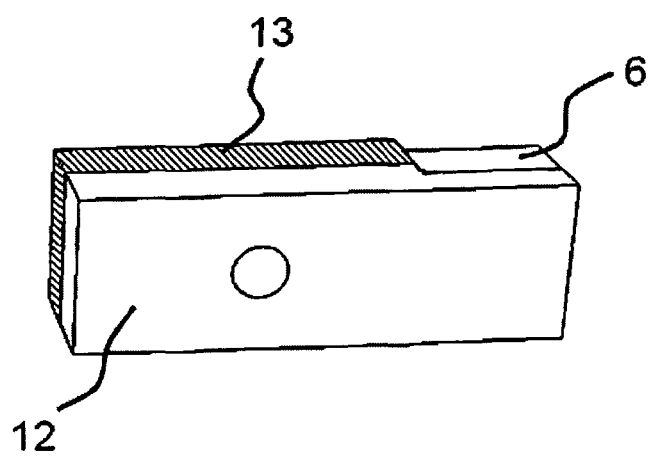

FIG. 1 is a perspective view of a device according to the invention in a partial view, FIG. 2 is a detail view of the article of FIG. 1, FIG. 3 is a further object of the present invention in a partial view, FIG. 4 is a more detailed view of the article of FIG. 1, FIG. 5 is an illustration of the basic idea of the invention, FIG. 6 shows a further device according to the invention, FIG. 7 shows a further device according to the invention, FIG. 8 shows a part of a device according to the invention, FIG. 9 shows a further part of a device according to the invention, FIG. 10 is a partial view of another device according to the invention.

Equal or similar acting parts are—if appropriate—given the same reference numerals. Some technical features of the embodiments described below may also lead to further developments of the invention in combination with the features of the above embodiments.

DETAILED DESCRIPTION OF THE INVENTION

The inventive device according to FIG. 1 comprises a counter element 1, which couples with a rotatably mounted rotor element 2. For this purpose the counter element 1 is a rim formed with a lateral surface 1.1, which forms a continuous circular path. The rim 1 is conductive, for example, made of aluminium. The rotor element 2 comprises a carrier 2.1 on which a plurality of magnets is arranged peripherally which is described in more detail below. The carrier 2.1. is rotatably mounted with the magnets on an axis 2a. A rotational movement of the counter element/the rim in direction 4a causes a rotational movement of the rotor element 2 equipped with magnets in direction 4b. The rotor element 2 of this object which now acts as an eddy current magnetic gear is encapsulated entirely to the outside for example, to weathering, within one box 6. No sensitive, moving parts are in direct contact with the environment. The rotary axis inside the axis 2a, is perpendicular to a straight line through the axis of the rim 1a.

The rotor element 2 is in an operative position for generating multiple eddy current based magnetic fields in the counter element 1. The coil and the lamp, which can be powered by the current induced in the coil, are not shown.

FIG. 2 is a partial view of the object according to FIG. 1, where the box 6 was omitted. The rotor element 2 is separated by a small gap 3.1 from the side surface 1.1 of the counter element 1. North poles 2b (not hatched) and south poles 2c (hatched) of the magnets 3 of the rotor element alternate, so that a rotational movement 4a of the wheel/the counter element causes a rotational movement in the direction 4b of the rotor element 2 equipped with magnets. The arrow 5 shows the direction of the magnetic field lines starting at the magnet 3, which is closest to the side surface 1.1 of the rim 1.

In the embodiment of FIG. 3 an even number of magnets 3 is arranged in the circumferential direction of the carrier 2.1 spaced from each other. A magnetic field that directly acts on the side surface 1.1. can be formed undisturbed by the gaps between adjacent magnets.

FIG. 4 shows the subject of FIG. 1 with the associated coil 7. The windings of the coil 7 are parallel to the side surface 1.1 of the rim 1 respectively the counter element 1, which results in a space-saving arrangement laterally to the rim. Beyond, the box 6 serves as a receptacle for the axis 2a.

In the schematic diagram of FIG. 5, the counter element is shown lying. The rim moves in direction V1. The rotor element 2 is equipped with permanent magnets 3 with alternating polarities and runs tangentially to the side 1.1 separated by an air gap. The magnetic field lines 4a and 4b of the magnet which is arranged closest to the counter element 1 permeate the counter element and induce opposed eddy current fields 5a and 5b, with the resulting magnetic fields 6a and 6b.

The magnetic field 6a located in front position with respect to the direction of rotation of the rim magnetically attracts magnet 3 while the magnetic field 6b in rear position magnetically repels magnet 3, so a force in direction V2 is exerted on said magnet 3. This results in a rotational movement in direction V3 of the rotor element 2. This movement is increased in that adjacent magnets have opposite polarities and are also repelled or attracted corresponding to the direction of rotation.

A device according to the invention with two magnetically interacting rotor elements 2 and 2.5 can be found in FIG. 6. The two magnetic fields of the rotor elements are merged, so that the counter element in the middle is located in an amplified magnetic field which allows for a larger distance between rim and rotor elements. Ideally, both rotor members have parallel axes of rotation and identical structure, in particular the same diameter, the same magnet size and same number of magnets. The current which is induced in the coil windings 7 is used to power the lighting means 10.

According to the embodiment of FIG. 7, two devices are arranged on a wheel rim 1 and serve to power the lamp 10 of the inventive bicycle 11. While the light source is arranged on a bracket 15 on the brake arm, the housings 6 including rotor element and coil are fixed to a fork 14.

An optimized rotor element is shown partially in FIG. 8. A hexagon-shaped (regarded in cross-section) carrier 2.1 has a total of six flat-shaped magnets 3 on its six peripheral faces.

At the outermost peripheral part of the carrier, the magnets are spaced apart so that the magnetic field lines don't interfere much with each other. The magnets which are arranged on a line that perpendicularly intersects the rotary axis have identical magnetic North-South orientation, so that the voltage induced in the coil is the maximum.

The minimum distance between magnets and coil windings is typically 0.5 mm. A coil with single winding (for example, FIG. 4) and 0.5 mm winding diameter of the copper wire and 60 turns on overall length of about 6 m produces a current of 0.4 A at and 3 V at a speed of 20 km/h. This means a power of 1.2 W with accompanying brake power of about 2 W. The brake power is nearly negligible and significantly lower than in the prior art. Simultaneously, the energy yield is much higher. When using high-efficiency LED the system provides power to reach a light amount of more than 140 lumen, which exceeds the minimum requirements of the German traffic rules many times.

Sufficient magnetic strength for a small sized light, with light emission above the requirements of the German traffic rules can be obtained by using magnets with field strength weaker than in the above-described exemplary embodiment, i.e. their magnetic strength may be between 860 kA/m and 950 kA/m. With an adhesive force of about 600 g and magnets in cuboid shape of size of 10×10×1 mm, a current of 0.1 A and 2V voltage at 20 km/h can be reached which is enough for light emission that corresponds to the requirements.

For taillights with even less light requirements, for example neodymium magnets of size of 5×4×1 mm are sufficient, which produce an adhesive force of 350 g, which means 0.5 A and 0.5 V with an adequate coil. Hereby, a thin coil (with 0.2 mm or 0.3 mm diameter) can have a positive effect, since with increasing internal resistance of the coil, a higher voltage can be achieved.

The lighting up of tail light or headlight when pulling the brakes particularly depends on the gear ratio and slippage of the magnet system. The smaller, the rotor element, the greater the acceleration when changing the distance to the rim by a certain value. For example, a reduction of the rim distance from 5 mm to 1 mm for a rotor element with 4 mm radius means the reduction of the effective rotor element radius from 9 mm to 5 mm and hence reduction of the effective rotor element circumference from about 56 mm to about 31 mm. This is accompanied by almost a doubling of the rotational speed and approximately a doubling of the current generated.

For a front light with reasonable rotor size of 15 mm radius, however the effective radius goes down from 20 mm to 16 mm when reducing the distance between rotor element and rim from 5 mm to 1 mm. Thus the percentage change when braking is distinctly lower in this case and a smaller difference in light intensity is observed.

FIG. 9 shows a non-detailed device in where only the rotor element housing box 6 can be seen. This box 6 is arranged on a brake shoe 12, which also carries a brake pad 13. As described above, the light of a bicycle lighting system according to the invention will light up when braking.

FIG. 10 shows a variation of the example according to FIG. 9 where parts of the box 6 (illustrated by an arc) are arranged inside of a part of the brake shoe 12.

The invention claimed is:

1. A device for contactless current generation on a rotatable counter element, said device comprising:
   at least one movably mounted rotor element having at least one magnet configured to move with said rotor element, and at least one coil, said coil having at least one winding of which a current is induced by said magnet, said current being usable to operate a consumer, said rotor element is movable by magnetic interaction with the counter element;
   wherein said rotor element and the counter element have different axial lines, and, in an operative position, said rotor element is configured to generate at least one magnetic field on a basis of an eddy current in the counter element, which forms an uninterrupted circular path, by means of continuous relative movement between the counter element and said rotor element, eddy current fields which are continuously opposed to one another and have oppositely polled magnetic fields to one another are induced in the counter element and said rotor element is thus moved together with the counter element with an eddy current gearing being formed.

2. The device according to claim 1, wherein the rotatable counter element is a wheel rim of a bicycle, the wheel rim consists of a conductive material.

3. The device according to claim 2, further comprising a lighting system having at least one lighting means conductively connected with said coil.

4. The device according to claim 3, wherein said lighting system is at least two lighting units each containing at least one diode light that are arranged in separate circuits with different conducting directions, such that each of said two lighting units are fed alternately by said current induced from said coil of said rotor element.

5. The device according to claim 3, further comprising a rectifier downstream to said coil, which rectifies said current of said coil.

6. The device according to claim 3, further comprising a carrier unit configured to adjust a distance between said rotor element and the counter element by displacement of said rotor element inside an outer shell of said lighting system.

7. The device according to claim 3, wherein said lighting means is fixed to a housing of said device, said housing encloses said coil.

8. The device according to claim 2, wherein said device for contactless current generation is arranged at a fork of the bicycle.

9. The device according to claim 2, wherein said device for contactless current generation is arranged at a brake of the bicycle, and is configured that said current induced in said coil is increased by an approximation of said rotor element and the wheel rim when braking.

10. The device according to claim 9, wherein said device is mounted on an element of the brake selected from the group consisting of a brake arm, a brake pad, a brake shoe, within a brake shoe, a mounting base of a Vbrake, a mounting base of a cantilever brake.

11. The device according to claim 1, wherein said rotor element comprises a plurality of magnets.

12. The device according to claim 11, wherein said magnets are arranged with alternating polarities along a periphery of said rotor element.

13. The device according to claim 12, wherein said rotor element is mounted rotatably, and wherein said magnets are arranged radially to an axis of rotation regarding a North-South orientation of said magnets.

14. The device according to claim 13, wherein said magnets are arranged regularly spaced apart along a periphery of a carrier.

15. The device according to claim 14, further comprises a second rotor element mounted on a side of the counter element opposite to said rotor element in a mutually reinforcing magnetically active position.

16. The device according to claim 14, wherein said coil is part of a generator drivable by said rotor element.

17. The device according to claim 14, wherein said winding of said coil leads completely around said rotor element, and said winding and said rotor element are encapsulated together in one housing.

18. The device according to claim 17, further comprising a further winding, said winding and said further winding are mutually angled and lead around said rotor element.

19. The device according to claim 1, further comprising an energy storage selected from the group consisting of a capacitor, and a battery, wherein said energy storage is configured to store electric energy during operation of said device and to subsequently release energy to said consumer.

* * * * *